March 7, 1939.  H. BROOKS ET AL  2,149,269
LIME SLAKING PROCESS
Filed Oct. 9, 1936
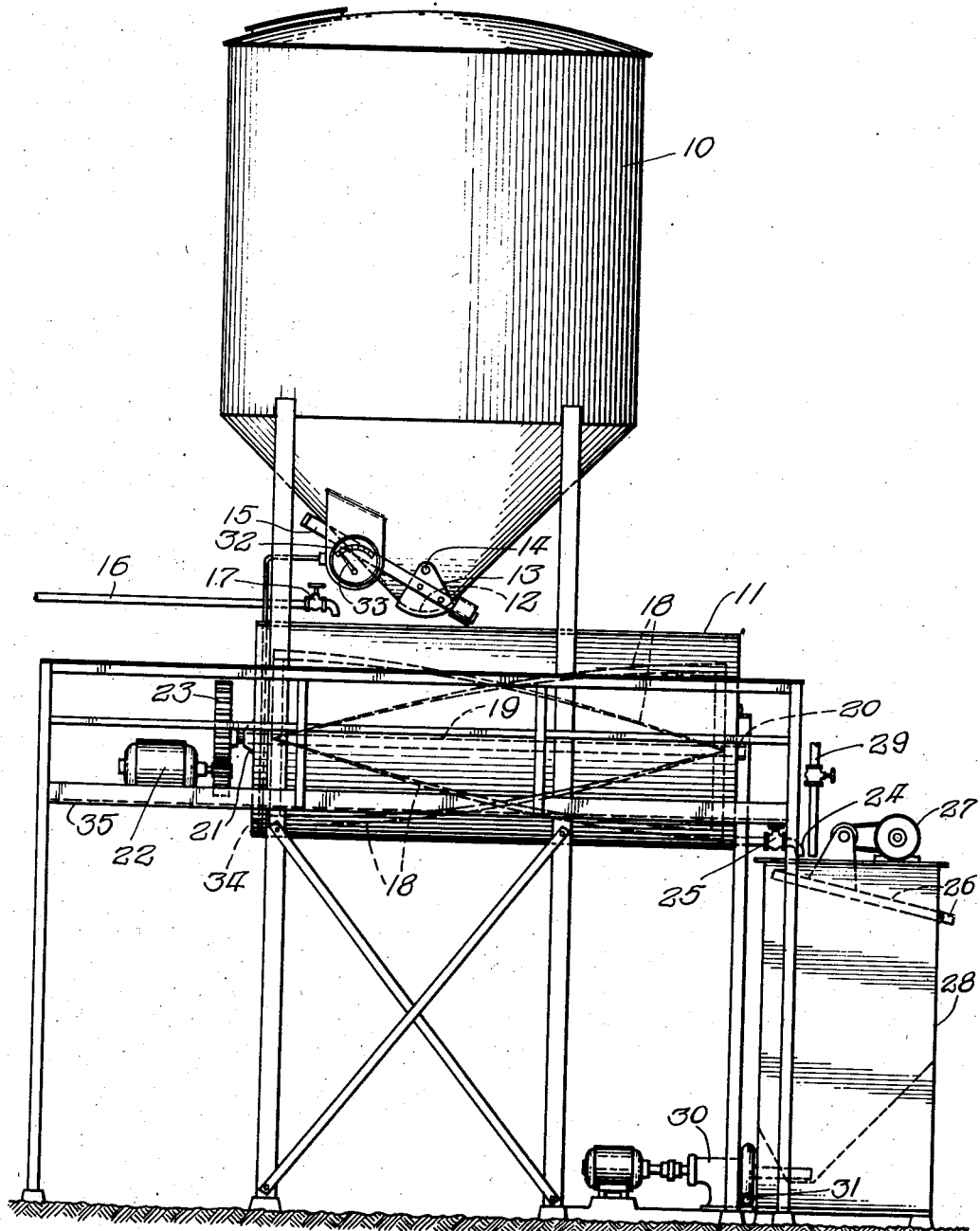
Inventors:
Hayden Brooks and
Robert A. Davis,
By Dynaforth, Lee, Chritton, Wiles, Attys.

Patented Mar. 7, 1939

2,149,269

UNITED STATES PATENT OFFICE 2,149,269

LIME SLAKING PROCESS

Hayden Brooks and Robert A. Davis, Birmingham, Ala., assignors to Chicago Bridge & Iron Company, a corporation of Illinois Application October 9, 1936, Serial No. 104,903

8 Claims. (Cl. 23—188)

This invention relates to means and a process for slaking quick-lime, and more particularly to governing the process in accordance with the temperature generated by the exothermic reaction.

This application is a continuation in part of application Serial No. 74,582, filed April 15, 1936.

One feature of this invention is that it enables dry lime, or quick-lime, to be slaked or hydrated easily; another feature of this invention is that none of the lime is burned or drowned during the slaking; yet another feature of this invention is that it enables lime to be properly slaked despite variations in its physical properties; a further feature of this invention is that it enables the consistency of the milk of lime to be maintained substantially constant; other features and advantages of this invention will be apparent from the following specification and the drawing.

Lime is the popular name of calcium oxide, CaO, and is prepared from natural lime stone by a process involving burning the stone in kilns. The physical and chemical characteristics of the lime depend, of course, both on the purity and characteristics of the original lime stone, and on the manufacturing process.

Quick-lime or dry lime is a white amorphous substance consisting of practically pure calcium oxide. It combines with water and crumbles to bits evolving much heat in an exothermic reaction wherein the oxide is converted into a hydrate. This process is known as slaking. While lime may be slaked by exposing it to atmosphere and allowing it to absorb water therefrom, the only practical commercial method of slaking is by an immersion of the lime in water.

Chemically, a certain number of pounds of water per pound of lime is required for slaking, determinable from chemical analysis of the lime and a balancing of the equation for slaking. In practice, however, it has been found that proper slaking of the lime requires amounts of water varying as much as fifteen percent (15%) above or below the theoretically correct quantity. Although different batches of lime may have the same chemical analysis, physical differences created in the manufacturing process apparently account for variations in the water required.

Lime is now generally slaked by dumping a certain number of pounds thereof into a volume of water predetermined in accordance with theoretical proportions. If there is not enough water the temperature of the lime, due to the exothermic reaction, becomes too high and some of the lime "burns"; if there is too much water, some of the lime is lost by "drowning." The average operator of a slaking process generally tends to put in too much rather than too little water and as a result as high as twenty percent (20%) of the lime is frequently lost by drowning.

The present invention comprises mixing the lime and water in quantities and proportions determined by the temperature to which the resultant mixture is elevated by the exothermic reaction. It has been found that regardless of the variations in the characteristics of the quick-lime the resulting milk of lime is of constant good quality if the lime is slaked in accordance with temperature. Variations in the amounts of water used in bringing the mixture to a desired temperature is apparently water required to satisfy the physical, and not the chemical characteristics of the lime. The process disclosed herein involves constantly recording the temperature of the mixture with a thermometer or other similar means, and adding further quantities of lime or water in proportions determined by the temperature.

In the particular embodiment of this invention disclosed in the accompanying drawing a dry lime storage means comprising a hopper or tank 10 is provided above the mixing or slaking tank 11. The storage tank is of a size dependent upon the requirement of any particular installation and is elevated above the mixing tank 11 in order that the transfer of lime from the hopper to the mixing tank may be by gravity. Control means for selectively admitting lime to the mixing tank is provided, here consisting of the opening 12 in the bottom of the hopper 10 covered by valve gate 13. The valve gate is pivotally mounted at 14 and manually controllable by the counter-weighted lever 15. Means for selectively admitting water to the mixing tank 11 is also provided, here shown as the water pipe 16 terminating in the manually controlled faucet 17.

The mixing tank 11 is preferably substantially semi-cylindrical in shape, and its size is also determined by the output requirements of any particular installation. The tank is provided with agitating means comprising agitator blades 18 mounted on shaft 19 journaled in bearings 20 and 21. The shaft 19 extends without the tank at one end thereof and is driven by a motor 22 through a reduction gearing 23. The tank 11 is provided with an outlet 24 controlled by the valve 25, and adapted to discharge the contents of the tank onto a vibrating screen 26 driven by the motor 27. The rather thick milk of lime which comes from the mixing tank and passes through the vibrating screen falls into the sump 28. Here further water may be added to it as by the pipe 29, to get a milk of lime of the consistency desired for a particular use. The resulting milk of lime may be drawn from the sump 28 by the centrifugal pump 30 and pumped through the outlet 31 to any desired point. This milk of lime may be pumped to an aging tank, for example, where it is desired to make lime putty for construction work; or it may be pumped to a storage vat where it is kept agitated to prevent settling and from which it may be added to the drinking water supply of a city through a metering device.

Means for recording the temperature of the mixture in the tank 11 is provided, here shown as a thermometer 32 having a visual temperature recording means comprising a pointer 33, and provided with actuating means 34 near the bottom of the tank. In addition to the visual record, the thermometer also makes a permanent temperature record as by a mark traced on a moving roll. It will be noted that the lime control lever 15, the water control valve 17, and the visual indicating means 33 of the thermometer, are all conveniently grouped so that an operator, standing, for example, on the platform 35, may watch the thermometer and control the admission of lime and water to the mixing tank 11 in accordance with the temperature thereof.

The process is performed in the above described apparatus in a manner governed primarily by the temperature, as heretofore described. The slaking tank is first about half filled with water. This quantity is not at all critical, but varies in accordance with the characteristics of the quick-lime to be slaked. If the lime is quick slaking, somewhat more water is used; if slow slaking, somewhat less water. The lever 15 is then manipulated to slowly add lime to the water in the slaking tank. At the commencement of the feeding of the lime, or just about that time, the agitator is started in motion so that the blades 18 keep the water and lime in the slaking tank thoroughly mixed. The lime is gradually added until the temperature of the mixture in the slaking tank reaches a point between 120° and 140° F., preferably about 130°. The valve 17 is then opened, and thereafter both lime and water are added relatively slowly to the mixture already in the tank. This addition is not necessarily continuous, in that the feeding of one or the other constituent of the milk of lime may be temporarily discontinued as temperature readings indicate, but the feeding may be designated as substantially continuous. The proportion of lime to water added during this phase of the process is higher than the correct slaking proportion, so that the temperature of the mixture in the slaking tank continues to rise. The lime and water are so added that the temperature of the mixture continues to rise slowly at a substantially constant rate to a temperature between 160° and 200° F., preferably about 180°. The slaking or mixing tank 11 is exposed to the weather, and the temperature of the admitted water and lime also varies somewhat, so that while the preferred temperature is 180° F., the slaking temperature may vary somewhat therefrom. During this phase the operator, if skillful, can add both lime and water continuously, merely varying the proportion at intervals. If the temperature jumps considerably from the normal rate of rise, however, it is necessary to either add considerably more water or greatly reduce, or even discontinue altogether, the feeding of lime temporarily; if, on the other hand, the temperature does not rise at the normal rate, or even stops rising altogether, more lime must be added. When the mixture has reached a temperature of about 180° F. the feed of lime and water is so proportioned as to hold the temperature of the mixture substantially constant at about 180° F. At this phase of the process both lime and water may be added if the tank 11 is not yet near full, or only one constituent or the other as temperature indications may require if the mixture has nearly filled the tank. In either case, one or both constituents are so added as to maintain the temperature substantially constant until the slaking is completed, which may be visually determined by the operator. The valve 25 is then opened to dump the batch from the slaking tank, and at this time it may be screened and further diluted in a sump tank 28, if desired. When the tank is empty the valve 25 is closed, water admitted to the tank, and the slaking process repeated.

While we have shown and described certain embodiments of our invention, it is to be understood that it is capable of many modifications. Changes therefore in the construction and arrangement may be made without departing from the spirit and scope of the invention as disclosed in the appended claims, in which it is our intention to claim the novelty inherent in our invention as broadly as permissible in view of the prior art.

What we claim as new, and desire to secure by Letters Patent, is:

1. The method of slaking quick-lime comprising feeding water and quick-lime to a slaking tank in such proportions that the temperature of the mixture rises slowly at a substantially constant rate to a temperature between 160° and 200° F., and then continuing the feeding in such proportions as to maintain the temperature of the mixture substantially constant at a temperature between 160° and 200° F. until slaking is completed, sufficient water being present at all times to maintain the mixture in liquid state.

2. The method of slaking quick-lime comprising feeding water and quick-lime to a slaking tank in proportions such that the temperature of the mixture, elevated by the exothermic reaction, rises slowly at a substantially constant rate to a temperature of substantially 180° F., and then continuing the feeding in such proportions as to maintain the temperature of the mixture substantially constant at such temperature until slaking is completed, sufficient water being present at all times to maintain the mixture in liquid state.

3. The method of claim 1, wherein the mixture is agitated during said feeding.

4. The method of claim 2, wherein the mixture is agitated during said feeding.

5. The process of manufacturing milk of lime comprising placing water in a slaking tank; adding quick-lime slowly thereto and agitating the resulting mixture until the temperature, elevated by the exothermic reaction, rises to a temperature between 120° and 140° F.; then feeding both water and quick-lime to said tank in such proportions that the temperature rises slowly at a substantially constant rate to a temperature between 160° and 200° F.; and then adding one or the other of the constituents to said mixture in such quantities as to maintain the temperature substantially constant at said last mentioned temperature.

6. The process of manufacturing milk of lime comprising placing water in a slaking tank; adding quick-lime slowly thereto and agitating the resulting mixture until the temperature, elevated by the exothermic reaction, rises to substantially 130° F.; then feeding both water and quick-lime to said tank in such proportions that the temperature rises slowly at a substantially constant rate to substantially 180° F.; and then adding one or both of the constituents of said mixture in such quantities as to maintain the temperature substantially constant at said last-mentioned temperature.

7. The process of manufacturing milk of lime comprising placing one of the constituents thereof, water, in a slaking tank; slowly adding the other constituent, quick-lime, until the temperature of the resulting mixture, elevated by the exothermic reaction, rises to substantially 130° F.; then substantially continuously feeding both water and quick-lime in such proportions that the temperature of the mixture rises slowly at a substantially constant rate to substantially 180° F.; and then further adding one or both of said constituents in such quantities as to maintain the temperature of the mixture substantially constant at said last mentioned temperature until slaking is completed.

8. The process of claim 7 wherein said mixture is agitated throughout said process.

HAYDEN BROOKS.
ROBERT A. DAVIS.